US009632938B2

(12) United States Patent
Chen et al.

(10) Patent No.: US 9,632,938 B2
(45) Date of Patent: Apr. 25, 2017

(54) METHOD AND APPARATUS FOR PUSHING MEMORY DATA (71) Applicant: Huawei Technologies Co., Ltd., Shenzhen (CN)

(72) Inventors: Mingyang Chen, Beijing (CN); Mingyu Chen, Beijing (CN); Zehan Cui, Beijing (CN); Licheng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 14/680,262

(22) Filed: Apr. 7, 2015

(65) Prior Publication Data

US 2015/0212944 A1 Jul. 30, 2015

Related U.S. Application Data (63) Continuation of application No. PCT/CN2013/076792, filed on Jun. 5, 2013.

(30) Foreign Application Priority Data

Oct. 10, 2012 (CN) .......................... 2012 1 0381338

(51) Int. Cl.
*G06F 12/08* (2016.01)
*G06F 12/0862* (2016.01)
(Continued)

(52) U.S. Cl.
CPC ...... *G06F 12/0862* (2013.01); *G06F 12/0866* (2013.01); *G06F 17/30132* (2013.01);
(Continued)

(58) Field of Classification Search
None
See application file for complete search history.

(56) References Cited

U.S. PATENT DOCUMENTS 5,652,858 A * 7/1997 Okada ..................... G06F 9/383
710/52
6,151,662 A * 11/2000 Christie .............. G06F 9/30047
711/134
(Continued)

FOREIGN PATENT DOCUMENTS

CN  1514369 A  7/2004
CN  1731374 A  2/2006
(Continued)

OTHER PUBLICATIONS

Yang et al. (Tolerating Memory Latency through Push Prefetching for Pointer-Intensive Applications), pp. 30, 2004 ACM 0164-0925/2004/0500-0001.*
(Continued)

*Primary Examiner* — Kaushikkumar Patel
(74) *Attorney, Agent, or Firm* — Conley Rose, P.C.

(57) ABSTRACT

A method and an apparatus for pushing memory data from a memory to a push destination storage used to store data prefetched by a central processing unit (CPU) in a computing system are disclosed. In the method, a memory controller of the computing system periodically generates a push command according to a push period. Then the memory controller acquires a push parameter of to-be-pushed data according to the push command and sends at least one memory access request to memory according to the push parameter, where the at least one memory access request is used to request the to-be-pushed data from the memory. After receiving the to-be-pushed data that is sent according to the at least one memory access request by the memory, the memory controller buffers the to-be-pushed data and pushes the to-be-pushed data from the data buffer to the push destination storage.

16 Claims, 5 Drawing Sheets (51) Int. Cl.
*G06F 17/30* (2006.01)
*G06F 12/0866* (2016.01)

(52) U.S. Cl.
CPC ............. *G06F 2212/1024* (2013.01); *G06F 2212/312* (2013.01); *G06F 2212/602* (2013.01); *G06F 2212/6022* (2013.01); *G06F 2212/6028* (2013.01)

(56) References Cited

U.S. PATENT DOCUMENTS

| | | | |
|---|---|---|---|
| 6,247,107 B1* | 6/2001 | Christie | G06F 12/0215 711/137 |
| 6,687,807 B1* | 2/2004 | Damron | G06F 12/0862 711/137 |
| 6,728,840 B1* | 4/2004 | Shatil | G06F 12/0866 707/999.003 |
| 8,380,680 B2* | 2/2013 | Berger | G06F 17/3048 707/687 |
| 9,323,680 B1* | 4/2016 | Salli | H04N 21/23406 |
| 2003/0126116 A1* | 7/2003 | Chen | G06F 12/0862 |
| 2003/0208660 A1* | 11/2003 | van de Waerdt | G06F 12/0862 711/137 |
| 2004/0133747 A1* | 7/2004 | Coldewey | G06F 12/0862 711/137 |
| 2005/0228955 A1* | 10/2005 | Day, III | G06F 12/0862 711/137 |
| 2005/0246500 A1 | 11/2005 | Iyer et al. | |
| 2006/0095679 A1 | 5/2006 | Edirisooriya | |
| 2007/0067382 A1* | 3/2007 | Sun | G06F 12/0862 709/203 |
| 2007/0083714 A1 | 4/2007 | Henry et al. | |
| 2008/0127131 A1* | 5/2008 | Gao | G06F 8/4442 717/140 |
| 2008/0229072 A1 | 9/2008 | Yamamura et al. | |
| 2011/0099204 A1* | 4/2011 | Thaler | G06F 9/5038 707/797 |
| 2011/0238953 A1 | 9/2011 | Metsugi et al. | |
| 2011/0320523 A1* | 12/2011 | Chan | G06F 17/301 709/203 |

FOREIGN PATENT DOCUMENTS

| | | |
|---|---|---|
| CN | 102184151 A | 9/2011 |
| CN | 102207853 A | 10/2011 |

OTHER PUBLICATIONS

Byna et al. (Taxonomy of Data Prefetching for Multicor Processors) pp. 405-417, Journal of Computer Science and Technology 24(3): 405-417 May 2009.*

Foreign Communication From a Counterpart Application, PCT Application No. PCT/CN2013/076792, English Translation of International Search Report dated Sep. 12, 2013, 2 pages.

Foreign Communication From a Counterpart Application, PCT Application No. PCT/CN2013/076792, English Translation of Written Opinion dated Sep. 12, 2013, 6 pages.

Foreign Communication From a Counterpart Application, European Application No. 13845440.0, Extended European Search Report dated Aug. 26, 2015, 5 pages.

* cited by examiner

METHOD AND APPARATUS FOR PUSHING MEMORY DATA

CROSS-REFERENCE TO RELATED APPLICATIONS

This application is a continuation of International Application No. PCT/CN2013/076792, filed on Jun. 5, 2013, which claims priority to Chinese Patent Application No. 201210381338.7, filed on Oct. 10, 2012, both of which are hereby incorporated by reference in their entireties.

TECHNICAL FIELD

Embodiments of the present invention relate to the field of computers, and in particular, to a method and an apparatus for pushing memory data.

BACKGROUND

Because a speed of a central processing unit (CPU) is much higher than a memory read speed, data needs to be prefetched and put in a place that can be accessed by a processor more quickly, such as a cache or an additional buffer (for example, a scratchpad memory).

By using a compiler, a compiler-controlled software prefetcher inserts a prefetch instruction, where the prefetch instruction can be used for requesting data before a processor uses the data, so as to improve a data access speed of the processor. However, a great number of prefetch instructions are inserted, which may cause that the number of instructions that need to be run is increased, thereby resulting in an extra instruction overhead.

SUMMARY

Embodiments of the present invention provide a method and an apparatus for pushing memory data, which can push to-be-pushed data to a push destination register according to a push parameter of the to-be-pushed data and a periodically generated push command, thereby reducing an extra instruction overhead caused by insertion of a great number of prefetch instructions.

According to a first aspect, a method for pushing memory data is provided, where the method includes periodically generating a push command according to a push period, where one push command is periodically generated within one push period; acquiring a push parameter of to-be-pushed data according to the push command, where the push parameter includes a push destination storage of the to-be-pushed data, the push parameter is determined by a data structure type of the to-be-pushed data, and the data structure type of the to-be-pushed data includes at least a non-sequential structure type; sending at least one memory access request to memory according to the push parameter, where the at least one memory access request is used to request the to-be-pushed data from the memory; receiving the to-be-pushed data that is sent according to the at least one memory access request by the memory, and placing, in a data buffer, the to-be-pushed data that is sent according to the at least one memory access request by the memory; and pushing the to-be-pushed data from the data buffer to the push destination storage.

With reference to the first aspect, in a first possible implementation manner, before the periodically generating a push command according to a push period, the method further includes determining the push period.

With reference to the first aspect, in a second possible implementation manner, the push parameter further includes storage information of the to-be-pushed data, an access step of the to-be-pushed data, and the number of times of pushing the to-be-pushed data.

With reference to the second possible implementation manner of the first aspect, in a third possible implementation manner, the sending at least one memory access request to memory according to the push parameter includes generating an access address of the to-be-pushed data according to the storage information of the to-be-pushed data; generating the at least one memory access request according to the push command, the number of times of pushing the to-be-pushed data, and the access address of the to-be-pushed data, and sorting the at least one memory access request in a queue; and sending the at least one memory access request to the memory according to an order in the queue.

With reference to the second possible implementation manner of the first aspect or the third possible implementation manner of the first aspect, in a fourth possible implementation manner, that the push parameter is determined by a data structure type of the to-be-pushed data includes, if the to-be-pushed data is an array, the storage information of the to-be-pushed data includes a start address of the array and an element size of the array; or if the to-be-pushed data is a linked list, the storage information of the to-be-pushed data includes a start address of the linked list, a node size of the linked list, a position of a pointer field of the linked list, and an end mark of the linked list; or if the to-be-pushed data is a pointer array, the storage information of the to-be-pushed data includes a start address of the pointer array, a size of a pointer field of the pointer array, and an element size of the pointer array.

With reference to the first possible implementation manner of the first aspect, in a fifth possible implementation manner, the determining the push period includes determining a pre-agreed time period as the push period; or determining the push period according to a received periodical push command; or determining the push period according to a use rate of the to-be-pushed data.

With reference to the first aspect, in a sixth possible implementation manner, the pushing the to-be-pushed data from the data buffer to the push destination storage includes acquiring status information of the push destination storage of the to-be-pushed data, where the status information indicates whether there is valid data stored in the push destination storage; if the status information indicates that there is no valid data stored in the push destination storage, pushing the to-be-pushed data from the data buffer to the push destination storage of the to-be-pushed data; and setting a status of the push destination storage of the to-be-pushed data to a state indicating that there is valid data stored in the push destination storage.

According to a second aspect, an apparatus for pushing memory data is provided, where the apparatus includes a generating unit configured to periodically generate a push command according to a push period, where one push command is periodically generated within one push period; an acquiring unit configured to acquire a push parameter of to-be-pushed data according to the push command, where the push parameter includes a push destination storage of the to-be-pushed data, the push destination storage is a storage that stores data prefetched by a CPU, the push parameter is determined by a data structure type of the to-be-pushed data, and the data structure type of the to-be-pushed data includes at least a non-sequential structure type; where the generating unit is further configured to generate at least one memory access request according to the push parameter, where the at least one memory access request is used to request the to-be-pushed data from memory; a sending unit configured to send the at least one memory access request to the memory; and a receiving unit configured to receive the to-be-pushed data that is sent according to the at least one memory access request by the memory, and place, in a data buffer, the to-be-pushed data that is sent according to the at least one memory access request by the memory; where the sending unit is further configured to push the to-be-pushed data from the data buffer to the push destination storage.

With reference to the second aspect, in a first possible implementation manner, the apparatus further includes a determining unit configured to determine the push period.

With reference to the second aspect, in a second possible implementation manner, the push parameter further includes storage information of the to-be-pushed data, an access step of the to-be-pushed data, and the number of times of pushing the to-be-pushed data.

With reference to the second possible implementation manner of the second aspect, in a third possible implementation manner, the generating unit is configured to generate an access address of the to-be-pushed data according to the storage information of the to-be-pushed data, and generate the at least one memory access request according to the push command, the number of times of pushing the to-be-pushed data, and the access address of the to-be-pushed data; and the sending unit is configured to sort the at least one memory access request in a queue, and send the at least one memory access request to the memory according to an order in the queue.

With reference to the second possible implementation manner of the second aspect or the third possible implementation manner of the second aspect, in a fourth possible implementation manner, that the push parameter is determined by a data structure type of the to-be-pushed data includes, if the to-be-pushed data is an array, the storage information of the to-be-pushed data includes a start address of the array and an element size of the array; or if the to-be-pushed data is a linked list, the storage information of the to-be-pushed data includes a start address of the linked list, a node size of the linked list, a position of a pointer field of the linked list, and an end mark of the linked list; or if the to-be-pushed data is a pointer array, the storage information of the to-be-pushed data includes a start address of the pointer array, a size of a pointer field of the pointer array, and an element size of the pointer array.

With reference to the first possible implementation manner of the second aspect, in a fifth possible implementation manner, the determining unit is configured to determine a pre-agreed time period as the push period; or determine the push period according to a received periodical push command; or determine the push period according to a use rate of the to-be-pushed data.

With reference to the second aspect, in a sixth possible implementation manner, the acquiring unit is further configured to acquire status information of the push destination storage of the to-be-pushed data, where the status information indicates whether there is valid data stored in the push destination storage; the sending unit is configured to, if the status information indicates that there is no valid data stored in the push destination storage, push the to-be-pushed data from the data buffer to the push destination storage of the to-be-pushed data; and the sending unit is configured to send status setting information to the CPU, where the status setting information indicates that a status of the push destination storage of the to-be-pushed data is set to a state indicating that there is valid data stored in the push destination storage.

According to a third aspect, an apparatus for pushing memory data is provided, where the apparatus includes a receiving unit, a processor, a sending unit, and a memory, where the processor is configured to periodically generate a push command according to a push period, and the memory is configured to store an instruction that enables the processor to periodically generate a push command according to a push period, where one push command is periodically generated within one push period; the processor is configured to acquire a push parameter of to-be-pushed data according to the push command, and the memory is further configured to store an instruction that enables the processor to acquire a push parameter of to-be-pushed data according to the push command, where the push parameter may include a push destination storage of the to-be-pushed data, the push destination storage is a storage that stores data prefetched by a CPU, the push parameter is determined by a data structure type of the to-be-pushed data, and the data structure type of the to-be-pushed data includes at least a non-sequential structure type; the processor is further configured to generate at least one memory access request according to the push parameter, and the memory is further configured to store an instruction that enables the processor to generate at least one memory access request according to the push parameter, where the at least one memory access request is used to request the to-be-pushed data from memory; the sending unit is configured to send the at least one memory access request to the memory; the receiving unit is configured to receive the to-be-pushed data that is sent according to the at least one memory access request by the memory, and place, in a data buffer, the to-be-pushed data that is sent according to the at least one memory access request by the memory; and the sending unit is further configured to push the to-be-pushed data from the data buffer to the push destination storage.

With reference to the third aspect, in a first possible implementation manner, the processor is configured to determine the push period, and the memory is configured to store an instruction that enables the processor to determine the push period.

With reference to the third aspect, in a second possible implementation manner, the push parameter further includes storage information of the to-be-pushed data, an access step of the to-be-pushed data, and the number of times of pushing the to-be-pushed data.

With reference to the second possible implementation manner of the third aspect, in a third possible implementation manner, the processor is configured to generate an access address of the to-be-pushed data according to the storage information of the to-be-pushed data; the processor is configured to generate the at least one memory access request according to the push command, the number of times of pushing the to-be-pushed data, and the access address of the to-be-pushed data; and the sending unit is configured to sort the at least one memory access request in a queue, and send the at least one memory access request to the memory according to an order in the queue.

With reference to the second possible implementation manner of the third aspect or the third possible implementation manner of the third aspect, in a fourth possible implementation manner, that the push parameter is determined by a data structure type of the to-be-pushed data includes, if the to-be-pushed data is an array, the storage information of the to-be-pushed data includes a start address of the array and an element size of the array; or if the to-be-pushed data is a linked list, the storage information of the to-be-pushed data includes a start address of the linked list, a node size of the linked list, a position of a pointer field of the linked list, and an end mark of the linked list; or if the to-be-pushed data is a pointer array, the storage information of the to-be-pushed data includes a start address of the pointer array, a size of a pointer field of the pointer array, and an element size of the pointer array.

With reference to the first possible implementation manner of the third aspect, in a fifth possible implementation manner, the processor is configured to determine a pre-agreed time period as the push period; or determine the push period according to a received periodical push command; or determine the push period according to a use rate of the to-be-pushed data.

With reference to the third aspect, in a sixth possible implementation manner, the processor is configured to acquire status information of the push destination storage of the to-be-pushed data, where the status information indicates whether there is valid data stored in the push destination storage; the sending unit is configured to, if the status information indicates that there is no valid data stored in the push destination storage, push the to-be-pushed data from the data buffer to the push destination storage of the to-be-pushed data; and the sending unit is configured to send status setting information to the CPU, where the status setting information indicates that a status of the push destination storage of the to-be-pushed data is set to a state indicating that there is valid data stored in the push destination storage.

Based on the foregoing technical solutions, in the embodiments of the present invention, to-be-pushed data can be pushed to a push destination register according to a push parameter of the to-be-pushed data and a periodically generated push command, which prevents a great number of prefetch instructions from being generated due to pushed data. Therefore, in the embodiments of the present invention, an extra instruction overhead caused by insertion of a great number of prefetch instructions can be reduced.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
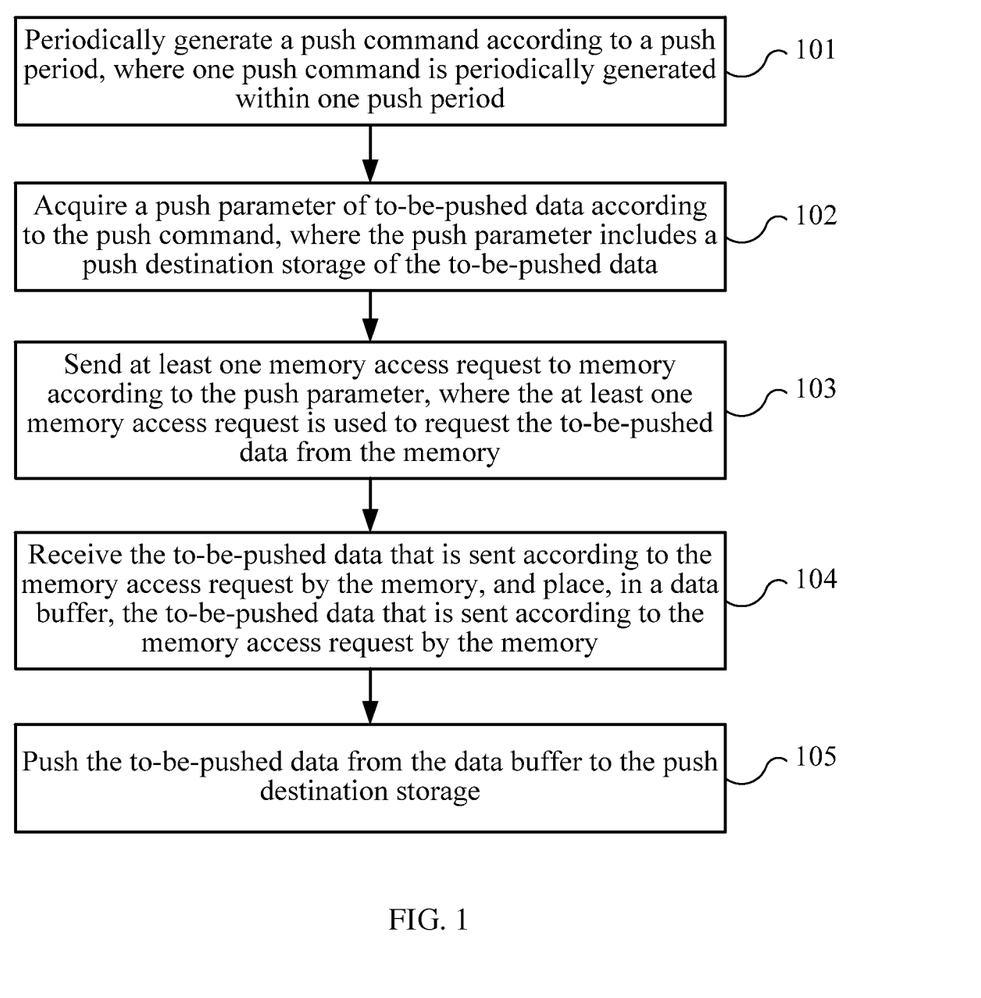
FIG. 1 is a flowchart of a method for pushing memory data according to an embodiment of the present invention.

FIG. 1 is a flowchart of a method for pushing memory data according to an embodiment of the present invention. The method shown in FIG. 1 is executed by a memory controller.

101: Periodically generate a push command according to a push period, where one push command is periodically generated within one push period.

102: Acquire a push parameter of to-be-pushed data according to the push command, where the push parameter includes a push destination storage of the to-be-pushed data, the push destination storage is a storage that stores data prefetched by a CPU, the push parameter is determined by a data structure type of the to-be-pushed data, and the data structure type of the to-be-pushed data includes at least a non-sequential structure type.

103: Send at least one memory access request to memory according to the push parameter, where the at least one memory access request is used to request the to-be-pushed data from the memory.

104: Receive the to-be-pushed data that is sent according to the at least one memory access request by the memory, and place, in a data buffer, the to-be-pushed data that is sent according to the at least one memory access request by the memory.

105: Push the to-be-pushed data from the data buffer to the push destination storage.

According to the method in this embodiment of the present invention, to-be-pushed data can be pushed to a push destination register according to a push parameter of the to-be-pushed data and a periodically generated push command, thereby reducing an extra instruction overhead caused by insertion of a great number of prefetch instructions.

Optionally, a data type, which is supported by the pushing method, of the to-be-pushed data may be a non-sequential structure type, such as a linked list or a pointer array. Certainly, this embodiment of the present invention also supports a sequential structure type, such as an array.

Optionally, in this embodiment of the present invention, the push parameter of the to-be-pushed data may further include storage information of the to-be-pushed data, an access step of the to-be-pushed data, and the number of times of pushing the to-be-pushed data. According to the storage information of the to-be-pushed data, the push controller in this embodiment of the present invention may generate a request address of a memory access request by using an address generator. According to the number of times of pushing the to-be-pushed data, the push controller may determine a count value of a push counter, so as to determine the number of memory access requests that need to be generated according to a current push command.

Further, if the to-be-pushed data is an array, the storage information of the to-be-pushed data includes a start address of the array, an element size of the array, and an access step of the array. In this embodiment of the present invention, the start address of the array may be used as a request address of a first memory access request; and then, an address of another element in the array may be determined according to the element size, for example, an address of an $N^{th}$ element in the array is start address+element size*(N−1).

Alternatively, if the to-be-pushed data is a linked list, the storage information of the to-be-pushed data includes a start address of the linked list, a node size of the linked list, a position of a pointer field of the linked list, and an end mark of the linked list. In this embodiment of the present invention, the start address of the linked list may be used as a request address of a first memory access request; an address pointed to by a pointer field of a node pointed to by the start address of the linked list may be used as a request address of a second memory access request; and the rest may be deduced by analogy, until the number of pushing times is reached or the linked list ends.

Alternatively, if the to-be-pushed data is a pointer array, the storage information of the to-be-pushed data includes a start address of the pointer array, a size of a pointer field of the pointer array, and an element size of the pointer array. In this embodiment of the present invention, the start address of the pointer array may be used as a request address of a first memory access request; an address pointed to by a pointer field of an element pointed to by the start address of the pointer array may be used as a request address of a second memory access request; and the rest may be deduced by analogy, until the number of pushing times is reached or the pointer array ends.

Further, the sending a memory access request to memory according to the push command and the push parameter may be implemented as follows: generating an access address of the to-be-pushed data according to the storage information of the to-be-pushed data; generating the at least one memory access request according to the push command, the number of times of pushing the to-be-pushed data, and the access address of the to-be-pushed data, and sorting the at least one memory access request in a queue, where the access address of the to-be-pushed data is a request address of the at least one memory access request; and sending the at least one memory access request to the memory according to an order in the queue. Pushing of data of a non-sequential structure can be implemented by sending the at least one memory access request to the memory according to the push parameter. Certainly, the method in this embodiment of the present invention also supports pushing of data of a sequential structure.

Optionally, a pre-agreed time period may be determined as the push period. For example, during start, a time period t may be set by default as a period of periodical pushing.

Optionally, the push period may be determined according to a received periodical push command. For example, a periodical push command sent by an operating system or an application program is received, and the push period is set according to the periodical push command. Determining the push period according to the received periodical push command enables the push controller to flexibly adjust the push period according to an external invocation.

Optionally, the push period may be determined according to a use rate of the to-be-pushed data. The use rate of the to-be-pushed data refers to a rate at which the push destination storage processes data. Obviously, as the storage that stores data prefetched by the CPU, the push destination storage in this embodiment of the present invention should be a storage with a high access speed, such as a register, a cache, or a scratchpad memory. Certainly, another storage with a similar or higher access speed may also be used, which is not limited in the present invention herein. Determining the push period according to the use rate of the to-be-pushed data can make full use of efficiency of the push controller, so as to prevent the push controller from wasting a resource because of an excessively short push period of the push controller, and prevent data prefetching efficiency of the CPU from being reduced because of an excessively long period of the push controller.

Optionally, as an embodiment, the to-be-pushed data may be pushed from the data buffer to the push destination storage by using the following method: acquiring status information of the push destination storage of the to-be-pushed data, where the status information indicates whether there is valid data stored in the push destination storage; if the status information indicates that there is no valid data stored in the push destination storage, pushing the to-be-pushed data from the data buffer to the push destination storage of the to-be-pushed data; and setting a status of the push destination storage of the to-be-pushed data to a state indicating that there is valid data stored in the push destination storage. For example, in this embodiment, the push destination storage may be a register, and may include a data field and a valid field. The push controller detects the valid field of the register, and if it is detected that the valid field is 0 and the push controller is in a push process, new data is pushed to the data field of the register and the valid field is set to 1. In addition, a new instruction move doubleword (MOVD) may be added to the CPU, and an action of the instruction is as follows: first, detecting the valid field of the register, where if the valid field is 1, it indicates that there is valid data stored in the register, and if the valid field is 0, it indicates that there is no valid data stored in the register; if the valid field is 1, moving data to the data field of the register according to MOVD, and setting the valid field to 0; and if the valid field is 0, stalling the instruction until the valid field is changed to 1, and then executing the foregoing operation. By monitoring an identification status of the push destination storage, a possibility of occurrence of an access conflict can be lowered, thereby improving data pushing efficiency.

Figure 2:
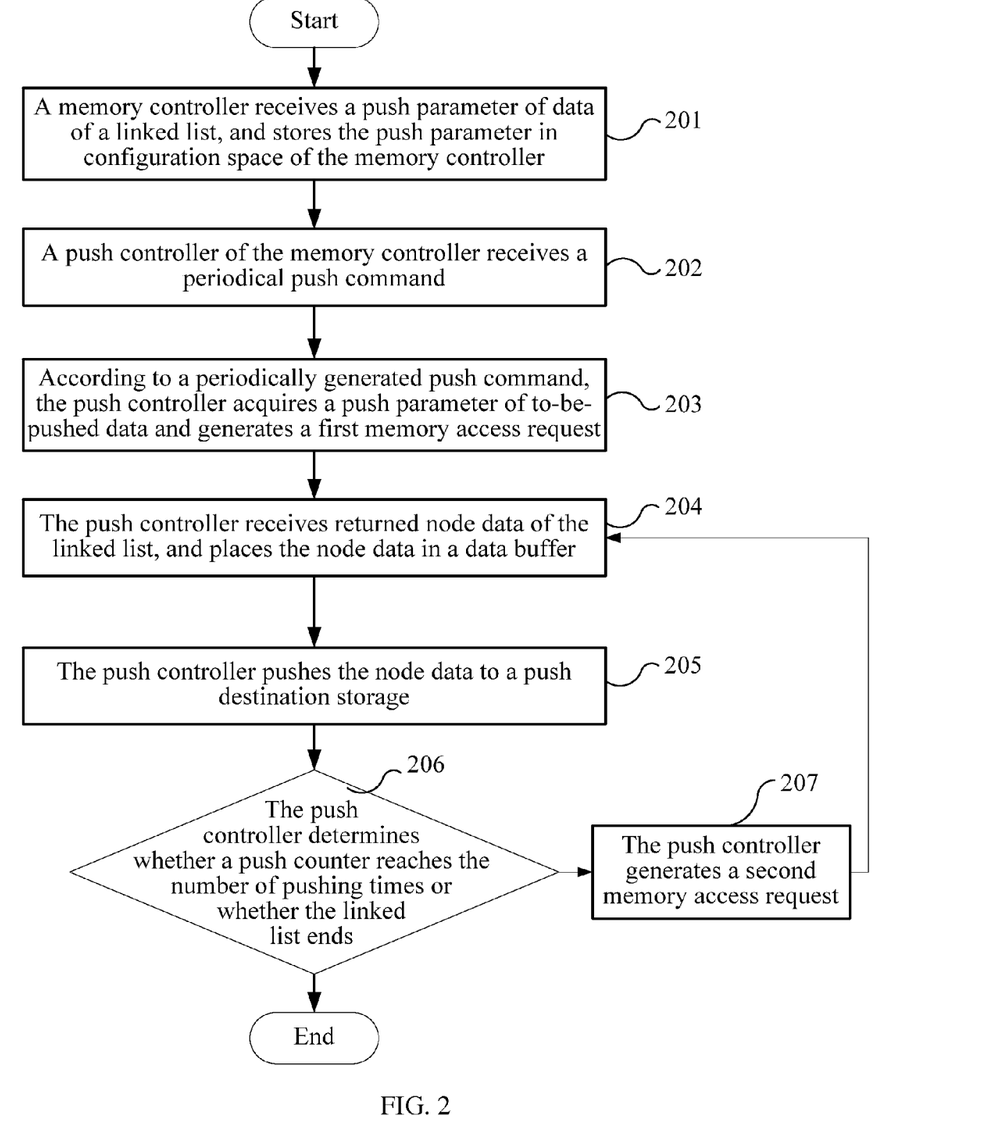
FIG. 2 is a flowchart of a method for pushing data of a linked list in memory according to an embodiment of the present invention.

FIG. 2 is a flowchart of a method for pushing data of a linked list in memory according to an embodiment of the present invention.

201: A memory controller receives a push parameter of data of a linked list, and stores the push parameter in configuration space of the memory controller, where the push parameter of the data of the linked list includes a start address of the linked list, a node size of the linked list, a position of a Next pointer field (used to indicate an address of next node data of the linked list), an end mark, the number of pushing times, and a push destination storage.

202: A push controller of the memory controller receives a periodical push command.

203: According to a periodically generated push command, the push controller acquires a push parameter of to-be-pushed data and generates a first memory access request. In this embodiment of the present invention, the to-be-pushed data is the data of the linked list, and an address generator uses a start address of the linked list in the push parameter as a request address of the first memory access request.

204: The push controller receives returned node data of the linked list, and places the node data in a data buffer.

205: The push controller pushes the node data to the push destination storage.

206: The push controller determines whether a push counter reaches the number of pushing times or whether the linked list ends; and if the push counter reaches the number of pushing times or the linked list ends, stop generating a memory access request; otherwise, go to step 207.

207: The push controller generates a second memory access request, where the address generator acquires a Next pointer field (namely, an address of next node data of the linked list) of node data just stored in the data buffer, and uses the Next pointer field as a request address of the second memory access request. After step 207 ends, go back to step 204.

According to this embodiment of the present invention, pushing of data of a linked list of a non-sequential structure type is implemented.

Figure 3:
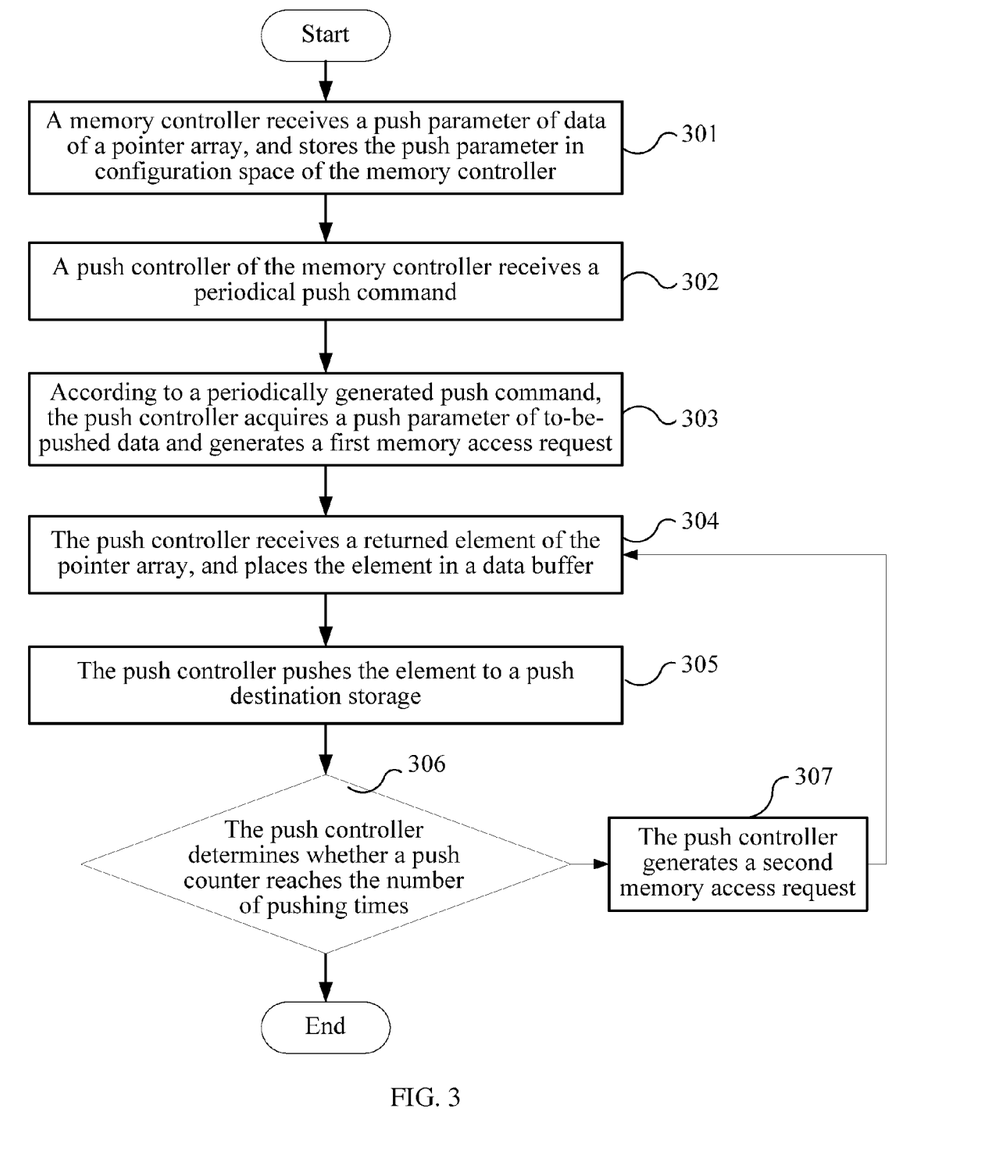
FIG. 3 is a flowchart of a method for pushing data of a pointer array in memory according to an embodiment of the present invention.

FIG. 3 is a flowchart of a method for pushing data of a pointer array in memory according to an embodiment of the present invention.

301: A memory controller receives a push parameter of data of a pointer array, and stores the push parameter in configuration space of the memory controller, where the push parameter of the data of the pointer array includes a start address of the pointer array, a size of a pointer field of the pointer array, an element size of the pointer array, an access step, the number of pushing times, and a push destination storage.

302: A push controller of the memory controller receives a periodical push command.

303: According to a periodically generated push command, the push controller acquires a push parameter of to-be-pushed data and generates a first memory access request. In this embodiment of the present invention, the to-be-pushed data is the data of the pointer array, and an address generator uses a start address of the pointer array in the push parameter as a request address of the first memory access request.

304: The push controller receives a returned element of the pointer array, and places the element in a data buffer.

305: The push controller pushes the element to the push destination storage.

306: The push controller determines whether a push counter reaches the number of pushing times; and if the push counter reaches the number of pushing times, stop generating a memory access request; otherwise, go to step 307.

307: The push controller generates a second memory access request, where the address generator acquires a pointer field (namely, an address of a next element of the pointer array) of an element just stored in the data buffer, and uses the pointer field as a request address of the second memory access request. After step 307 ends, go back to step 304.

According to this embodiment of the present invention, pushing of data of a pointer array of a non-sequential structure type is implemented.

Obviously, the method in this embodiment of the present invention can also implement pushing of data of other non-sequential structure types, which is not described in detail in the present invention herein.

The push controller in this embodiment of the present invention can also implement pushing of data of a sequential structure type, this implementation process belongs to the prior art, which is not described in detail in the present invention herein.

Figure 4:
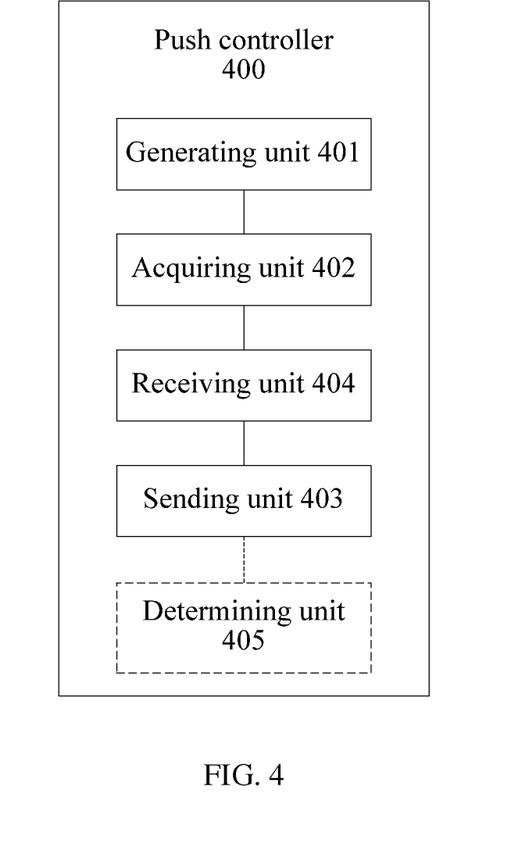
FIG. 4 is a schematic block diagram of a push controller according to an embodiment of the present invention.

FIG. 4 is a schematic block diagram of a push controller 400, which may also be referred to as an apparatus for pushing memory data, according to an embodiment of the present invention. The push controller 400 may include a generating unit 401, an acquiring unit 402, a sending unit 403, and a receiving unit 404.

The generating unit 401 may periodically generate a push command according to a push period, where one push command is periodically generated within one push period.

The acquiring unit 402 may acquire a push parameter of to-be-pushed data according to the push command, where the push parameter may include a push destination storage of the to-be-pushed data, the push destination storage is a storage that stores data prefetched by a CPU, the push parameter is determined by a data structure type of the to-be-pushed data, and the data structure type of the to-be-pushed data includes at least a non-sequential structure type.

The generating unit 402 may further generate at least one memory access request according to the push parameter, where the at least one memory access request is used to request the to-be-pushed data from memory.

The sending unit 403 may send the at least one memory access request to the memory.

The receiving unit 404 may receive the to-be-pushed data that is sent according to the at least one memory access request by the memory, and place, in a data buffer, the to-be-pushed data that is sent according to the at least one memory access request by the memory.

The sending unit 403 may further push the to-be-pushed data from the data buffer to the push destination storage.

In this embodiment of the present invention, the push controller 400 can push to-be-pushed data to a push destination register according to a push parameter of the to-be-pushed data and a periodically generated push command, thereby reducing an extra instruction overhead caused by insertion of a great number of prefetch instructions.

Optionally, a data type, which is supported by the push controller 400, of the to-be-pushed data may be a non-sequential structure type, such as a linked list or a pointer array; and may also be a sequential structure type, such as an array.

Optionally, in this embodiment of the present invention, the push parameter of the to-be-pushed data may further include storage information of the to-be-pushed data, an access step of the to-be-pushed data, and the number of times of pushing the to-be-pushed data.

Further, if the to-be-pushed data is an array, the storage information of the to-be-pushed data includes a start address of the array, an element size of the array, and an access step of the array; or if the to-be-pushed data is a linked list, the storage information of the to-be-pushed data includes a start address of the linked list, a node size of the linked list, a position of a pointer field of the linked list, and an end mark of the linked list; or if the to-be-pushed data is a pointer array, the storage information of the to-be-pushed data includes a start address of the pointer array, a size of a pointer field of the pointer array, and an element size of the pointer array.

Further, the generating unit 401 may generate an access address of the to-be-pushed data according to the storage information of the to-be-pushed data, and generate the at least one memory access request according to the push command, the number of times of pushing the to-be-pushed data, and the access address of the to-be-pushed data. The sending unit 403 may sort the at least one memory access request in a queue, and send the at least one memory access request to the memory according to an order in the queue.

Optionally, the push controller 400 may further include a determining unit 405. The determining unit 405 may be configured to determine the push period.

Optionally, the determining unit 405 may determine a pre-agreed time period as the push period. For example, during start, a time period t may be set by default as a period of periodical pushing.

Optionally, the determining unit 405 may determine the push period according to a received periodical push command. For example, a periodical push command sent by an operating system or an application program is received, and the push period is set according to the periodical push command.

Optionally, the determining unit 405 may determine the push period according to a use rate of the to-be-pushed data. The use rate of the to-be-pushed data refers to a rate at which the push destination storage processes data. Obviously, as the storage that stores data prefetched by the CPU, the push destination storage in this embodiment of the present invention should be a storage with a high access speed, such as a register, a cache, or a scratchpad memory. Certainly, another storage with a similar or higher access speed may also be used, which is not limited in the present invention.

Optionally, as an embodiment, the acquiring unit 402 may acquire status information of the push destination storage of the to-be-pushed data, where the status information indicates whether there is valid data stored in the push destination storage; the sending unit 403 may push the to-be-pushed data from the data buffer to the push destination storage of the to-be-pushed data if the status information indicates that there is no valid data stored in the push destination storage; and the sending unit 403 may further send status setting information to the CPU, where the status setting information indicates that a status of the push destination storage of the to-be-pushed data is set to a state indicating that there is valid data stored in the push destination storage.

In this embodiment of the present invention, the push controller 400 can implement the methods executed by a push controller that are shown in FIG. 1 to FIG. 3, which is not described in detail in the present invention herein.

Figure 5:
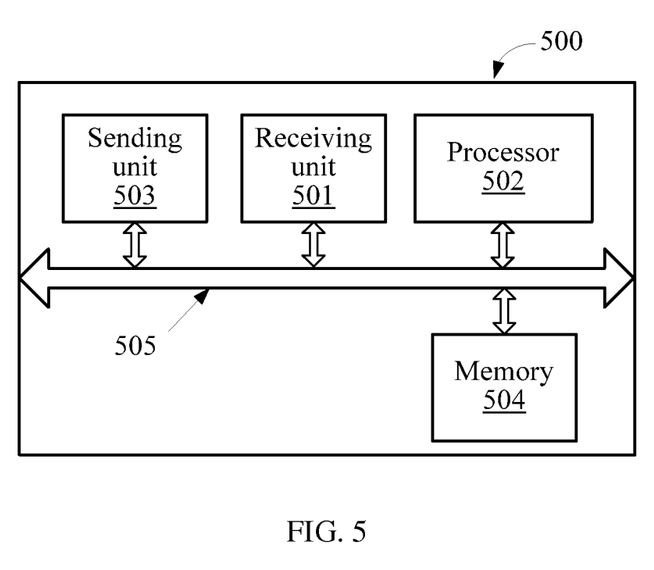
FIG. 5 is another schematic block diagram of a push controller according to an embodiment of the present invention.

FIG. 5 is a schematic block diagram of a push controller 500 of an apparatus for pushing memory data according to an embodiment of the present invention. The push controller 500 may include a receiving unit 501, a processor 502, a sending unit 503, and a memory 504.

The processor 502 may periodically generate a push command according to a push period, and the memory 504 may store an instruction that enables the processor 502 to periodically generate a push command according to a push period, where one push command is periodically generated within one push period.

The processor 502 may further acquire a push parameter of to-be-pushed data according to the push command, and the memory 504 may further store an instruction that enables the processor 502 to acquire a push parameter of to-be-pushed data according to the push command, where the push parameter may include a push destination storage of the to-be-pushed data, the push destination storage is a storage that stores data prefetched by a CPU, the push parameter is determined by a data structure type of the to-be-pushed data, and the data structure type of the to-be-pushed data includes at least a non-sequential structure type.

The processor 502 may further generate at least one memory access request according to the push parameter, and the memory 504 may further store an instruction that enables the processor 502 to generate at least one memory access request according to the push parameter, where the at least one memory access request is used to request the to-be-pushed data from memory.

The sending unit 503 may send the at least one memory access request to the memory.

The receiving unit 501 may receive the to-be-pushed data that is sent according to the at least one memory access request by the memory, and place, in a data buffer, the to-be-pushed data that is sent according to the at least one memory access request by the memory.

The sending unit 503 may further push the to-be-pushed data from the data buffer to the push destination storage.

In this embodiment of the present invention, the push controller 500 can push to-be-pushed data to a push destination register according to a push parameter of the to-be-pushed data and a periodically generated push command, thereby reducing an extra instruction overhead caused by insertion of a great number of prefetch instructions.

The processor 502 controls an operation of the push controller 500, and the processor 502 may also be called a CPU. The memory 504 may include a read-only memory and a random access memory, and provides instructions and data for the processor 502. The memory 504 may further include a non-volatile random access memory (NVRAM). In a specific application, components of the push controller 500 are coupled together by using a bus system 505, where in addition to a data bus, the bus system 505 may further include a power bus, a control bus, a status signal bus, and the like. For clarity of description, the buses are all marked as the bus system 505 in the figure.

The methods disclosed in the foregoing embodiments of the present invention may be applied to the processor 502, or may be implemented by the processor 502. The processor 502 may be an integrated circuit chip having a signal processing capability. During implementation, the steps of the foregoing methods may be accomplished by a hardware integrated logic circuit in the processor 502 or by instructions in the form of software. The foregoing processor 502 may be a general-purpose processor, a digital signal processor (DSP), an application-specific integrated circuit (ASIC), a field programmable gate array (FPGA), or another programmable logic device, a discrete gate or transistor logic device, or a discrete hardware assembly, which can implement or execute the methods, steps, and logical block diagrams disclosed in the embodiments of the present invention. The general-purpose processor may be a microprocessor, or the processor may be any regular processor. The steps of the methods disclosed in the embodiments of the present invention may be directly executed and implemented by a hardware decoding processor, or may be executed and implemented by a combination of hardware and software modules in a decoding processor. The software module may be located in a mature storage medium in the prior art, such as a random access memory, a flash memory, a read-only memory, a programmable read-only memory, an electrically erasable programmable read-only memory, or a register. The storage medium is located in the memory 504; and the processor 502 reads information in the memory 504, and performs the steps of the foregoing methods by using hardware of the processor 502.

Optionally, a data type, which is supported by the push controller 500, of the to-be-pushed data may be a non-sequential structure type, such as a linked list or a pointer array; and may also be a sequential structure type, such as an array.

Optionally, in this embodiment of the present invention, the push parameter of the to-be-pushed data may further include storage information of the to-be-pushed data, an access step of the to-be-pushed data, and the number of times of pushing the to-be-pushed data.

Further, if the to-be-pushed data is an array, the storage information of the to-be-pushed data includes a start address of the array, an element size of the array, and an access step of the array; or if the to-be-pushed data is a linked list, the storage information of the to-be-pushed data includes a start address of the linked list, a node size of the linked list, a position of a pointer field of the linked list, and an end mark of the linked list; or if the to-be-pushed data is a pointer array, the storage information of the to-be-pushed data includes a start address of the pointer array, a size of a pointer field of the pointer array, and an element size of the pointer array.

Further, the processor 502 may generate an access address of the to-be-pushed data according to the storage information of the to-be-pushed data, and generate the at least one memory access request according to the push command, the number of times of pushing the to-be-pushed data, and the access address of the to-be-pushed data. The sending unit 503 may order the at least one memory access request in a queue, and send the at least one memory access request to the memory according to an order in the queue.

Optionally, the processor 502 may further determine a push period, and the memory 504 may store an instruction that enables the processor 502 to determine a push period.

Optionally, the processor 502 may determine a pre-agreed time period as the push period. For example, during start, a time period t may be set by default as a period of periodical pushing.

Optionally, the processor 502 may determine the push period according to a received periodical push command. For example, a periodical push command sent by an operating system or an application program is received, and the push period is set according to the periodical push command.

Optionally, the processor 502 may determine the push period according to a use rate of the to-be-pushed data. The use rate of the to-be-pushed data refers to a rate at which the push destination storage processes data. Obviously, as the storage that stores data prefetched by the CPU, the push destination storage in this embodiment of the present invention should be a storage with a high access speed, such as a register, a cache, or a scratchpad memory. Certainly, another storage with a similar or higher access speed may also be used, which is not limited in the present invention.

Optionally, as an embodiment, the processor 502 may acquire status information of the push destination storage of the to-be-pushed data, where the status information indicates whether there is valid data stored in the push destination storage; the sending unit 503 may push the to-be-pushed data from the data buffer to the push destination storage of the to-be-pushed data if the status information indicates that there is no valid data stored in the push destination storage; and the sending unit 503 may further send status setting information to the CPU, where the status setting information indicates that a status of the push destination storage of the to-be-pushed data is set to a state indicating that there is valid data stored in the push destination storage.

In this embodiment of the present invention, the push controller 500 can implement the methods executed by a push controller that are shown in FIG. 1 to FIG. 3, which is not described in detail in the present invention herein.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method performed by a memory controller for pushing memory data from a memory to a push destination storage used to store data prefetched by a central processing unit (CPU) in a computing system, comprising:
  periodically generating a push command according to a push period, wherein one push command is periodically generated within one push period, and wherein the push period is calculated according to a periodical push command received from a program;
  acquiring a push parameter of to-be-pushed data according to the push command, wherein the push parameter comprises the push destination storage of the to-be-pushed data, wherein the push parameter is determined by a data structure type of the to-be-pushed data, wherein the data structure type of the to-be-pushed data comprises at least one linked list, and wherein the data structure type of the to-be-pushed data further comprises at least a non-sequential structure type;
  sending at least one memory access request to the memory according to the push parameter, wherein the at least one memory access request is used to request the to-be-pushed data from the memory;
  receiving and buffering the to-be-pushed data that is sent according to the at least one memory access request by the memory; and
  pushing the to-be-pushed data from a data buffer to the push destination storage.

2. The method according to claim 1, wherein the push parameter further comprises storage information of the to-be-pushed data, an access step of the to-be-pushed data, and the number of times of pushing the to-be-pushed data, and wherein sending the at least one memory access request to the memory according to the push parameter comprises:
  generating an access address of the to-be-pushed data according to the storage information of the to-be-pushed data;
  generating the at least one memory access request according to the push command, the number of times of pushing the to-be-pushed data, and the access address of the to-be-pushed data;
  sorting the at least one memory access request in a queue; and
  sending the at least one memory access request to the memory according to an order in the queue.

3. The method according to claim 2, wherein the to-be-pushed data comprises an array, and wherein the storage information of the to-be-pushed data comprises a start address of the array and an element size of the array.

4. The method according to claim 2, wherein the to-be-pushed data comprises the linked list, and wherein the storage information of the to-be-pushed data comprises a start address of the linked list, a node size of the linked list, a position of a pointer field of the linked list, and an end mark of the linked list.

5. The method according to claim 2, wherein the to-be-pushed data comprises a pointer array, and wherein the storage information of the to-be-pushed data comprises a start address of the pointer array, a size of a pointer field of the pointer array, and an element size of the pointer array.

6. The method according to claim 1, wherein before periodically generating the push command according to the push period, the method further comprises determining the push period according to the periodical push command, and wherein the periodical push command is received from an application program.

7. The method according to claim 1, wherein pushing the to-be-pushed data from the data buffer to the push destination storage comprises:
  acquiring status information of the push destination storage of the to-be-pushed data, wherein the status information indicates whether there is valid data stored in the push destination storage;
  pushing the to-be-pushed data from the data buffer to the push destination storage of the to-be-pushed data when the status information indicates that there is no valid data stored in the push destination storage; and
  setting a status of the push destination storage of the to-be-pushed data to a state indicating that there is valid data stored in the push destination storage.

8. The method according to claim 1, wherein the to-be-pushed data comprises data having a plurality of different structures, wherein the plurality of different structures comprises an array, the linked list, and a pointer array, wherein the push parameter comprises a plurality of different push parameters, and wherein each of the array, the linked list, and the pointer array are associated with different ones of the plurality of different push parameters.

9. A computing system comprising:
  a memory configured to store data;
  a push destination storage configured to store data prefetched by a central processing unit (CPU) in the computing system, wherein an access speed of the push destination storage is higher than an access speed of the memory; and
  a memory controller configured to:
    periodically generate a push command according to a push period, wherein one push command is periodically generated within one push period, and wherein the push period is calculated according to a periodical push command received from a program;
    acquire a push parameter of to-be-pushed data according to the push command, wherein the push parameter comprises the push destination storage of the to-be-pushed data, wherein the push parameter is determined by a data structure type of the to-be-pushed data, wherein the data structure type of the to-be-pushed data comprises at least one linked list, and wherein the data structure type of the to-be-pushed data further comprises at least a non-sequential structure type;
    send at least one memory access request to the memory according to the push parameter, wherein the at least one memory access request is used to request the to-be-pushed data from the memory;
    receive and buffering the to-be-pushed data that is sent according to the at least one memory access request by the memory; and
    push the to-be-pushed data from a data buffer to the push destination storage.

10. The computing system according to claim 9, wherein the push parameter further comprises storage information of the to-be-pushed data, an access step of the to-be-pushed data, and the number of times of pushing the to-be-pushed data, and wherein the operation of pushing by the memory controller comprises:
  generating an access address of the to-be-pushed data according to the storage information of the to-be-pushed data;
  generating the at least one memory access request according to the push command, the number of times of pushing the to-be-pushed data, and the access address of the to-be-pushed data;
  sorting the at least one memory access request in a queue; and sending the at least one memory access request to the memory according to an order in the queue.

11. The computing system according to claim 10, wherein the to-be-pushed data comprises an array, and wherein the storage information of the to-be-pushed data comprises a start address of the array and an element size of the array.

12. The computing system according to claim 10, wherein the to-be-pushed data comprises the linked list, and wherein the storage information of the to-be-pushed data comprises a start address of the linked list, a node size of the linked list, a position of a pointer field of the linked list, and an end mark of the linked list.

13. The computing system according to claim 10, wherein the to-be-pushed data comprises a pointer array, and wherein the storage information of the to-be-pushed data comprises a start address of the pointer array, a size of a pointer field of the pointer array, and an element size of the pointer array.

14. The computing system according to claim 9, wherein the memory controller is further configured to determine the push period according to the periodical push command before periodically generating the push command, and wherein the periodical push command is received from an operating system.

15. The computing system according to claim 9, wherein the operation of pushing by the memory controller comprises:
acquiring status information of the push destination storage of the to-be-pushed data, wherein the status information indicates whether there is valid data stored in the push destination storage;
pushing the to-he-pushed data from the data buffer to the push destination storage of the to-be-pushed data when the status information indicates that there is no valid data stored in the push destination storage; and
setting a status of the push destination storage of the to-be-pushed data to a state indicating that there is valid data stored in the push destination storage.

16. The computing system according to claim 9, wherein the to-be-pushed data comprises data having a plurality of different structures, wherein the plurality of different structures comprises an array, the linked list, and a pointer array, wherein the push parameter comprises a plurality of different push parameters, and wherein each of the array, the linked list, and the pointer array are associated with different ones of the plurality of different push parameters.

* * * * *